United States Patent
Ekström et al.

(10) Patent No.: US 7,292,564 B2
(45) Date of Patent: Nov. 6, 2007

(54) METHOD AND APPARATUS FOR USE IN REAL-TIME, INTERACTIVE RADIO COMMUNICATIONS

(75) Inventors: Hannes Ekström, Aachen (DE); Henning Wiemann, Aachen (DE); Andreas Schieder, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 730 days.

(21) Appl. No.: 10/719,018

(22) Filed: Nov. 24, 2003

(65) Prior Publication Data

US 2005/0111432 A1    May 26, 2005

(51) Int. Cl.
*H04B 3/20* (2006.01)
*H04J 3/06* (2006.01)

(52) U.S. Cl. ..................... 370/350; 370/285
(58) Field of Classification Search ............. 370/350, 370/285; 455/412
See application file for complete search history.

(56) References Cited

U.S. PATENT DOCUMENTS

| | | | |
|---|---|---|---|
| 5,734,969 A | 3/1998 | Shiraishi et al. | |
| 6,141,597 A | 10/2000 | Botzko et al. | |
| 2001/0039187 A1* | 11/2001 | Shively | 455/412 |
| 2003/0032439 A1 | 2/2003 | Harris et al. | |
| 2003/0223381 A1* | 12/2003 | Schroderus | 370/285 |

FOREIGN PATENT DOCUMENTS

EP    1182895    2/2002

OTHER PUBLICATIONS

WO 01/05076 A1 Jan. 18, 2001.
International Search Report mailed Mar. 2, 2005 in corresponding PCT Application PCT/SE2004/001618.

* cited by examiner

*Primary Examiner*—Joseph Feild
*Assistant Examiner*—Kiet Doan
(74) *Attorney, Agent, or Firm*—Nixon & Vanderhye P.C.

(57) ABSTRACT

Delays associated with real-time, interactive communications are reduced. A communications device A engages in a real-time, interactive communication with a communication device B. User A provides digital content to be transmitted to device B. A real-time, interactive connection is established between A and B which takes a certain delay time. That delay time is compensated for so that user B receives A's digital content and can respond to it faster than B could without the delay time compensation. This faster response by the B to A's communication enhances the interactive, real time, conversational feel of their communication.

53 Claims, 10 Drawing Sheets

METHOD AND APPARATUS FOR USE IN REAL-TIME, INTERACTIVE RADIO COMMUNICATIONS

TECHNICAL FIELD

The technical field relates to real time interactive services, such as a push-to-talk (PTT) service, in a digital radio communications system.

BACKGROUND

Push-to-talk (PTT) is a service where users may be connected in either a one-to-one radio communication or in a group radio communication. PTT service has traditionally been used in applications where one person, a "dispatcher" needs to a communicate to a group of people, such as field service personnel like taxi drivers, which is where the "dispatch" name for the service comes from. The PTT functionality is similar to analog walkie-talkies where the users take turns in talking. A user simply presses a button to start transmitting.

Nextel describes its PTT service "Direct Connect" as a "digital, long-range walkie-talkie" built into a wireless handset which lets it "connect" to a similarly configured handset without the need for standard cellular telephone "connect" procedures, such as dialing a telephone number and generating a ringing signal. The conversation exchange is managed as a half-duplex session that allows only one party to talk at a time. Various controls are used to avoid collisions when users transmit at the same time. For example, modern PTT communications often occur via a server, which responds to PTT requests by granting (or denying) a "floor," i.e., permission to transmit.

A PTT conversation may be communicated over standard, circuit-switched networks as well as over packet-switched, Internet Protocol (IP) networks. Indeed, PTT-type services have been offered on the Internet and are generally known as "voice chat." These services are usually implemented as personnel computer applications that send vocoder frames in EP packets, i.e., a voice-over-IP (VoIP) service, to a central group chat server, or possibly from client-to-client in a peer-to-peer service.

Push-to-talk calls are desirable because they use bandwidth efficiently—an important benefit in radio communications where radio bandwidth is a scarce and expensive resource. They also permit group calls as easily as one-to-one calls. Another key advantage of PTT services is that the communication is quick and spontaneous, initiated by simply pressing the PTT button, without a going through typical dialing and ringing sequences.

Unfortunately, set-up times and propagation delays in PTT communications diminish the interactive "feel" when the push-to-talk communication is two-way, e.g., A and B are having a conversation. The set-up time for a digital PTT call may take two to three seconds. An example initial PTT request-response cycle might look as follows:

At zero seconds, user A pushes a button to initiate a PTT conversation with user B and talks for ten seconds.
At three seconds, the set-up is finished, and user B starts playing out the information sent by A.
At thirteen seconds, the initial message from A is completely played out by B. At that very same moment, (assuming that B has extremely quick reactions), B pushes its PTT button to respond and talks for three seconds.
Sometime after sixteen seconds, (there are transfer delays in the system), A starts playing out B's response message.

As a result of the time associated with setting up the initial PTT connection between A and B and with communicating the first message from A to B, there is a significant delay after A stops talking and before A receives B's response message. This delay is quite noticeable, and although it may have been acceptable in one-way dispatch communications, such delays diminish the real time feel of two-way, interactive PTT calls. Indeed, these kinds of delays are troublesome in any kind of real time, interactive communication.

SUMMARY

The technology described below improves the interactive feel of and reduces delays associated with PTT and other real time, interactive communication exchanges. One example of another real-time, interactive communication is an interactive video communication. But for ease of description hereafter, a PTT speech service is employed as a non-limiting example of a real time, interactive communication exchange. A first communications device user initiates a PTT communication with a second communication device, e.g., by pressing a PTT button. At the time of initiation, the first device user provides initial digital content for transmission to the second device. In response to the PTT communication initiation, a set-up procedure begins to establish a PTT connection between the first and second devices. The delay time associated with establishing the PTT connection is compensated for so that the second device user receives the initial digital content and can respond faster than it could without the delay time compensation. A faster response by the second device user reduces the undesirable response delay time between when the first user stops talking and the second user's response is received. That shorter response time enhances the interactive, real-time, conversational feel of the PTT communication between the first and second users.

The delay time includes delays associated with setting up the PTT connection and the propagation time associated with sending the initial digital content from the first device to the second device. Although particularly well-suited to voice communications, the digital content may also be or include non-voice content as well, e.g., video. The communication devices may be for example mobile or stationary wireless devices including handsets, laptops, PDAs, etc. The PTT service may be supported in a circuit-switched network or a packet-switched network.

The delay compensation may be accomplished in a variety ways. In one non-limiting example, the initial digital content is time-compressed which effectively speeds up the playout of the initial digital content at the second device. In other words, if the initial digital content is a ten-second voice message, that voice message may be time-compressed so that it is played out in only seven seconds with a higher pitch/frequency. Such time compression may occur at the first device, second device, or at a PTT server involved in the PTT communications.

The delay compensation may include increasing the rate at which the digital content is transmitted over the PTT connection. As a result, the transmission rate is faster than the real-time rate at which the initial digital content is buffered in the first device. The result again is that the received data can be played out faster than real-time, thus reducing the time the sender must wait for the receiver's response.

For purposes of illustration, three, non-limiting, example PTT communication embodiments are described. A first example embodiment is implemented in a first sending radio A. A second example embodiment is implemented in a second receiving mobile radio B. And a third example embodiment is implemented using a PTT server. Details of those non-limiting, example embodiments are set forth below. Although those embodiments time compress uncoded information, the time compression may also be performed on coded information.

In addition to improving interactivity, the compensation does not require knowledge of communication setup and transfer delays. Implementation requires changes only on the application level, which minimizes its impact and facilitates its introduction in existing communications systems. Moreover, if compression is performed at the sender or in the server, the data volume that the connection to the receiver must convey is reduced.

Other delay compensation approaches and mechanisms for implementing them may be employed. For example, delay compensation may be based on buffer fill states. If the buffered data exceeds a threshold, playout is increased at the receiver. In other words, playout rate depends on the amount of data currently in the buffer. The flexibility of this compensation approach is particularly advantageous when the setup or other delays are not known or are not constant. Another example compensation technique for packetized information that specifies a playout rate in the packet header is to increase the playout rate in each packet's header until any delay is compensated. Real Time Protocol (RTP) headers use for transporting video are an example of packet headers that specify playout rates. This approach is advantageous because the packet content is not affected.

DETAILED DESCRIPTION

For purposes of explanation, and not limitation, the following description sets forth specific details, such as particular electronic circuitry, procedures, techniques, etc., in order to provide an understanding of the technology described in this case. In other instances, detailed descriptions of well-known methods, devices, and techniques, etc., are omitted so as not to obscure the description with unnecessary detail. For example, a PTT service is used below as an example real-time, interactive application. But the technology also may be employed in real time, interactive communications other than PTT communications. Individual function blocks are shown in one or more figures. Those skilled in the art will appreciate that one or more function blocks may be implemented using discrete components, multi-function hardware, a suitably-programmed computer or microprocessor, application specific integrated circuitry, etc. or any combination thereof. Also, it is understood that the terminology used herein is for the purpose of description and should not be regarded as limiting.

Figure 1:
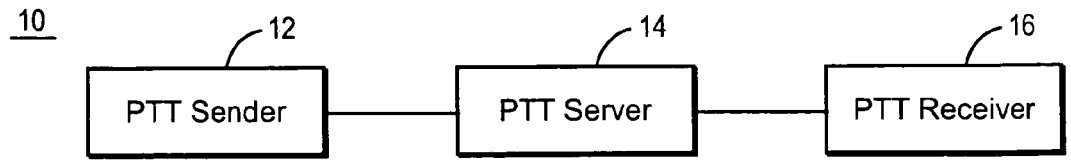
FIG. 1 illustrates a push-to-talk communication system.

FIG. 1 illustrates an example communications system 10 that supports PTT communications. A sending push-to-talk communications device 12 is coupled to a PTT server 14 which in turn is coupled to a PTT receiver device 16. Alternatively, the PTT communication may be set up and operated without a PTT server. The communications system 10 may be any type of communication system including those that support circuit-switched or packet-switched communications. The digital information exchanged can be speech, non-speech, or both. The PTT sending device 12 and the PTT receiving device 16 can be any type of communications device that supports PTT calls including any kind of wireless communications device, wireline telephones (e.g., used by a dispatcher), laptop computers, desktop computers, PDAs, etc.

Figure 2:
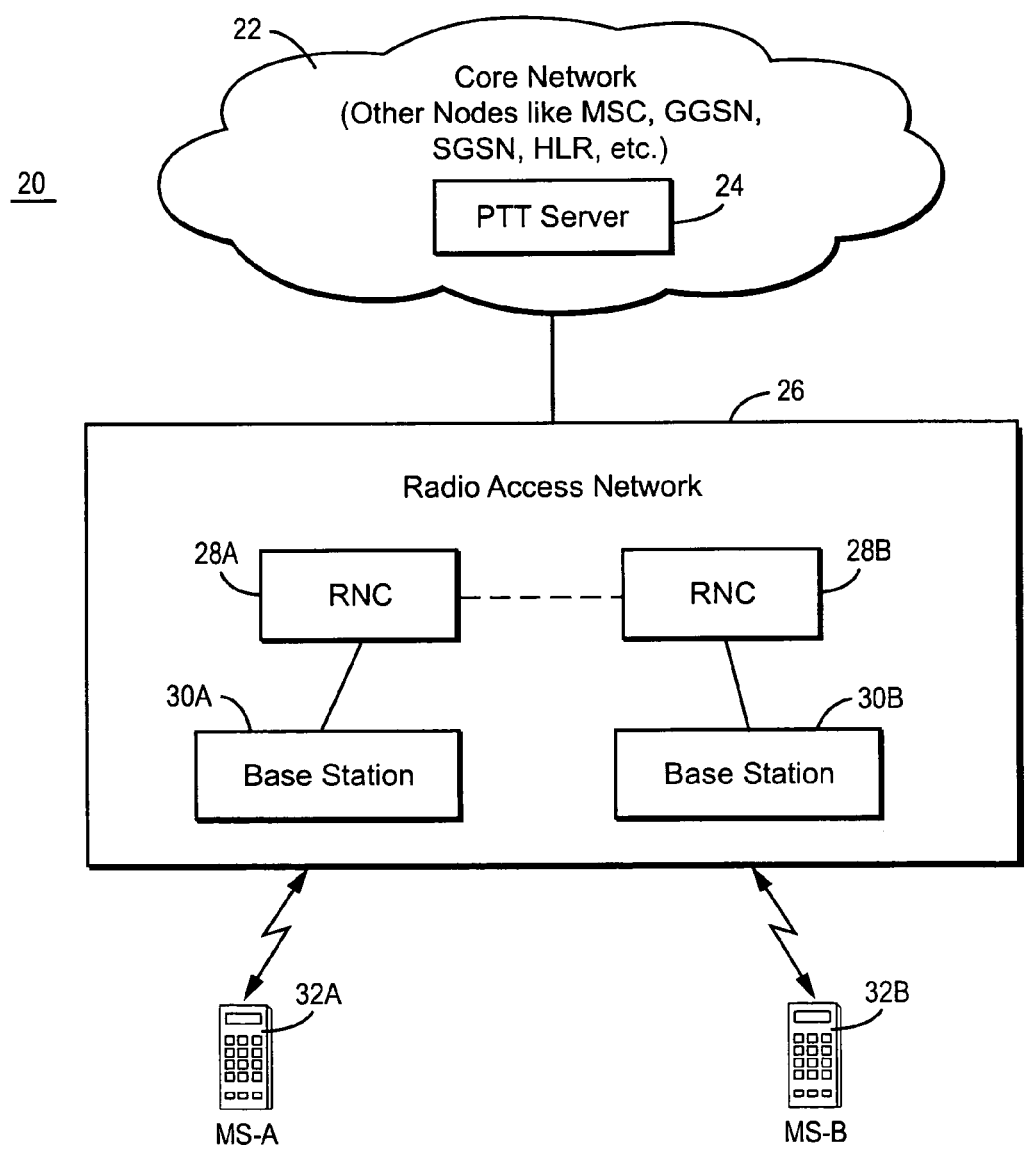
FIG. 2 illustrates a mobile radio system that supports a push-to-talk communications service.

FIG. 2 is another, more detailed example in which a mobile radio communication system 20 supports push-to-talk communications involving one or more mobile radios. A core network, represented as cloud 22, includes a push-to-talk server 24 in addition to one or more other nodes. Example core network nodes include a circuit-switched, core network node like a mobile switching center (MSC), a packet-switched node such as a gateway GPRS support node (GGSN) or a serving GPRS support node (SGSN), and a database node such as a home location register (HLR). The core network node(s) 22 is (are) coupled to a radio access network 26 which includes one or more radio network control (RNC) nodes 28. Representative RNC nodes 28A and 28B are each coupled to one or more base stations 30. For simplicity only, each RNC is showed coupled to one base station 30A and 30B, respectively. Mobile radio terminals 32 communicate over a radio interface with one or more base stations 30. Two example mobile stations are shown, MS-A 32A and MS-B 32B.

Subsequent examples describe mobile station A as initiating a PTT communication with mobile station B. These mobile stations need not be served by the same core network, the same radio access network, the same RNC, the same base station, etc. Again, the sender A and receiver B are not limited to mobile stations.

The push-to-talk server (which may also support push-to-fax or push-to-some other communication medium or format) is preferably an instant messaging server that relays digital data between A and B. It may also perform other functions such as determining user device location, address, telephone number, etc. to establish a PTT communication between users A and B. For example, user A may not know user B's specific telephone number, IP address, or even where user B is located. User A simply depresses the PTT button on A's mobile station, identifies the name of B, and sends that PTT request to the PTT server. The PTT server translates B's name into B's IP address and/or B's mobile identifier (e.g., IMSI) in order to page or otherwise locate B.

Once B is contacted, the PTT connection is set-up in the reverse direction from B to A to permit B's PTT response to A's initial message.

Figure 3:
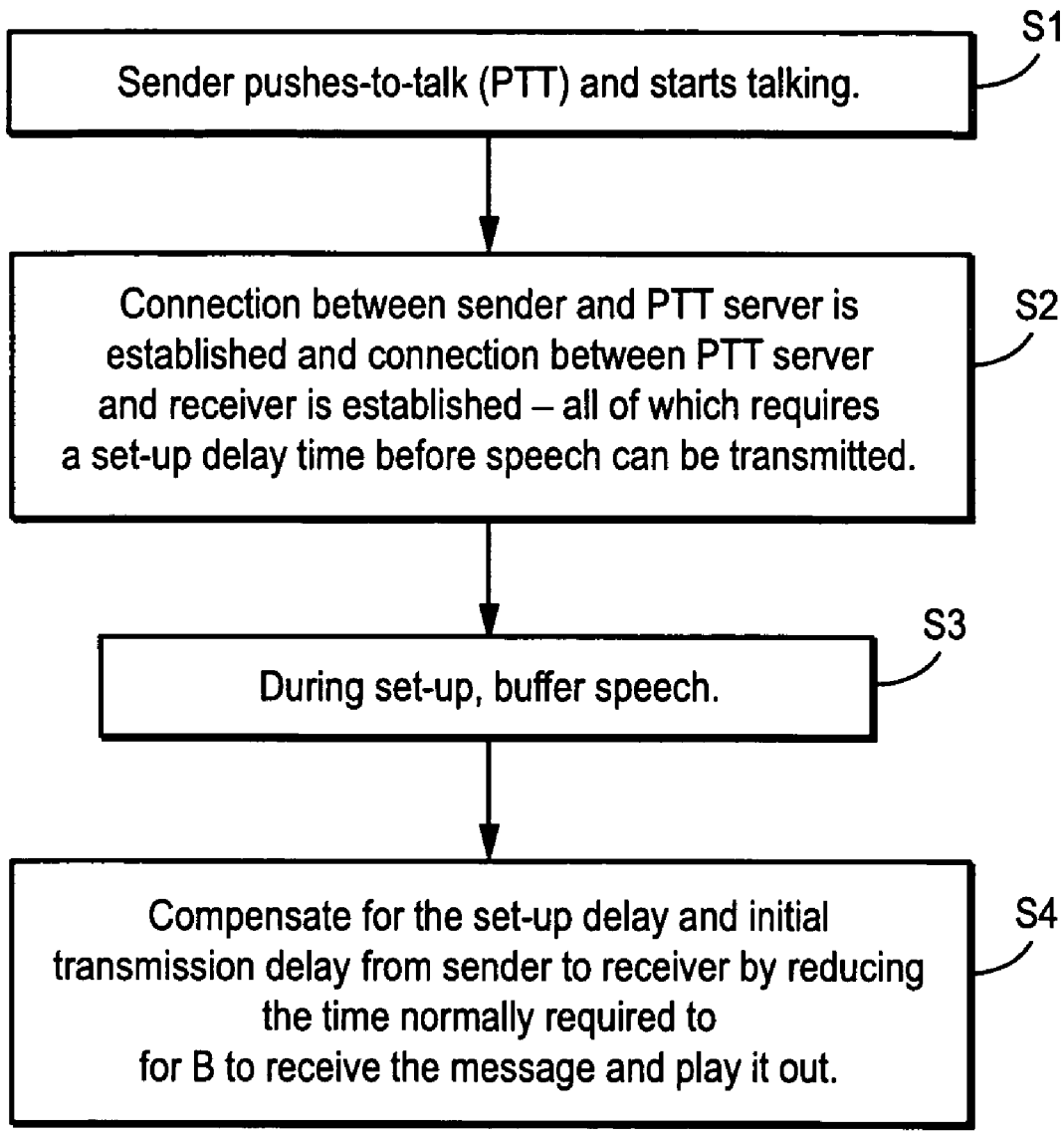
FIG. 3 is a flowchart that illustrates an example process for compensating for initial set-up delays for a push-to-talk communications.

Reference is made to the flowchart in FIG. 3 illustrating certain steps performed an example PTT voice communication in which initial PTT connection set-up delays are compensated for. The sender A presses a PTT button having identified the receiver B and starts talking (step S1). A PTT connection is established between sender A and the PTT server, and after locating receiver B, a PTT connection is established between the PTT server and receiver B (step S2). The PTT connection establishment procedures require a set-up delay time before any of sender A's speech can be transmitted to receiver B. During that PTT set-up delay, sender A's speech is buffered (step S3). The set-up delay and any initial transmission/propagation delay from sender A to receiver B are compensated by reducing the time normally required for B to receive the initial message and play it out (step S4). A number of example, non-limiting compensations techniques are described below, but any compensation technique may be used. The main objective of a compensation technique is to reduce the "dead time" sender A must wait before receiving B's response to A's initial message. Time compression, increased transmission rates, faster buffer playout, frame dropping, and playout rate adjustment in packet headers are only examples. Whatever compensation technique(s) is (are) employed, implementation may employ electronic hardware, software-driven computers, or both.

Figure 4:
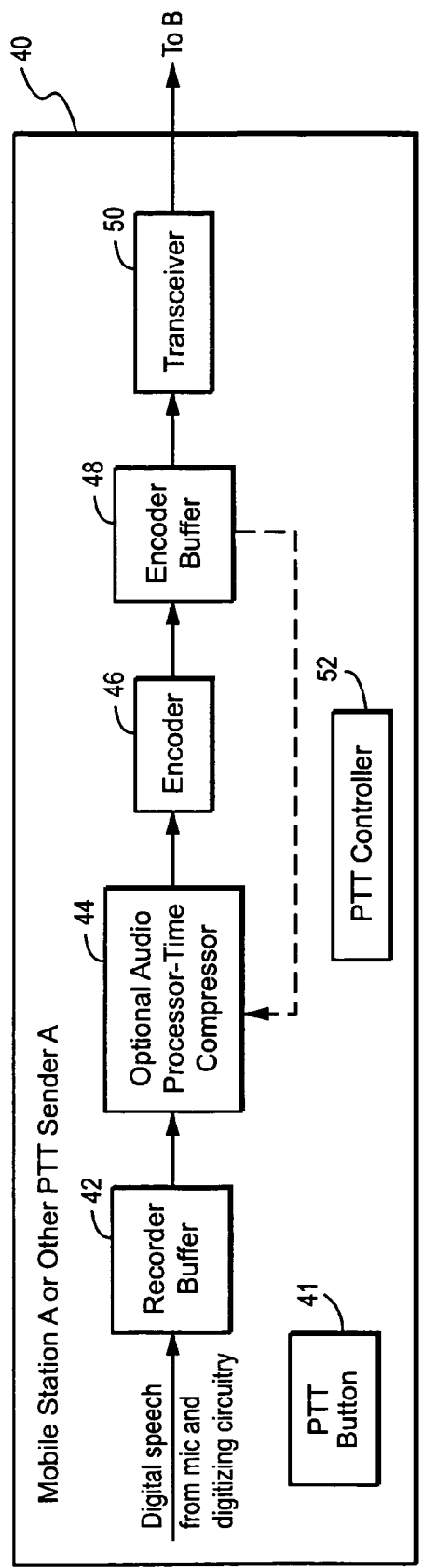
FIG. 4 is a function block diagram of a mobile station or other PTT sending device A.

FIG. 4 illustrates in function block form a mobile station A or other PTT sender A 40. The non-limiting example continues using speech as PTT content. Sender A initiates a PTT communication with receives B by pressing a PTT button 41 and starts speaking into a microphone (not shown). The detected speech is digitized and stored in a recorder buffer 42 while the PTT connection is being established. Once the PTT connection is established, the buffered information is readout by an optional audio processor 44 which performs, in a first example embodiment, time compression of the buffered information before passing it on to encoder 46. The audio processor/time compressor 44 is indicated as optional because it may or may not be used depending on how and/or where the PTT set-up delay compensation is implemented. The encoder 46 encodes the time-compressed information and stores it in an encoder buffer 48. The encoded information is read out and transmitted by the transceiver 50 over the established PTT connection at a data transmission rate determined by the PTT controller 52. Alternatively, the time compression may be performed on encoded information by the encoder or other device. The PTT controller 52 controls the operation of the elements shown in FIG. 4 and also performs various functions necessary to set-up, maintain, and break-down the PNT connection. As another alternative, a feedback link from the encoder buffer 48 to the audio processor 44 may be used to provide a basis for the time compression. In other words, the amount of data in the encoder buffer 48 dictates the amount of compression. If the amount of buffered data exceeds a threshold amount, time compression (or some alternative delay compensation technique) is employed.

Figure 5:
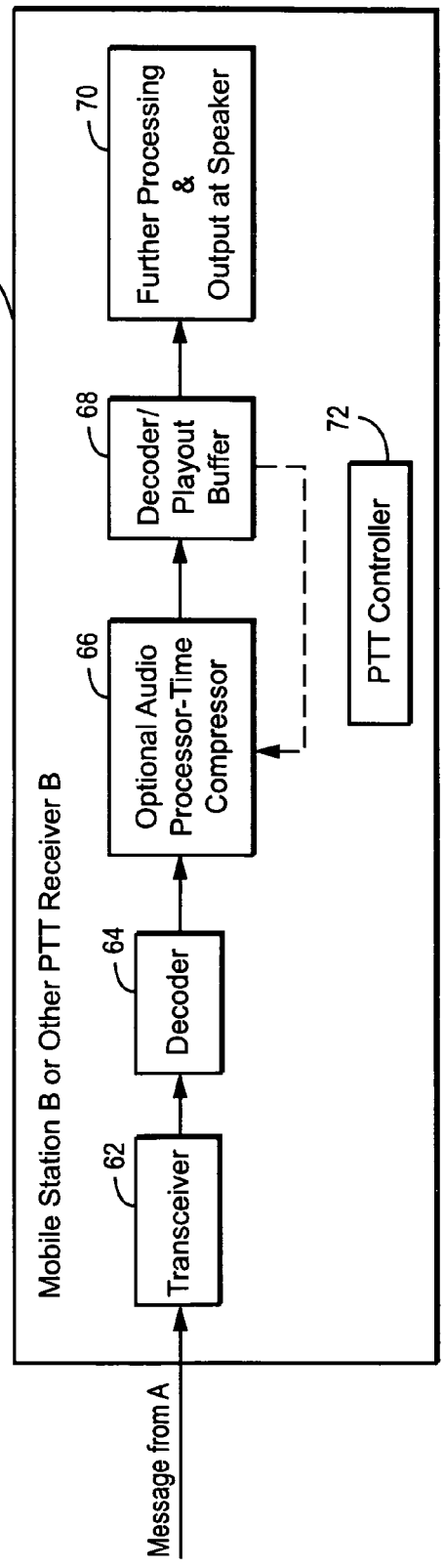
FIG. 5 is a function block diagram of a receiving mobile station or other PTT receiver B.

FIG. 5 illustrates a function block diagram of the PTT receiver B 60. Speech from the sender A is received at a transceiver 62 and provided to a decoder 64, which outputs a digital information stream. An audio processor-time compressor 66 (optional depending on the embodiment) is employed in the second embodiment to time compress the digital information before storage in a decoder/playout buffer 68. The information readout from the buffer 68 is further processed at block 70 into a suitable analog signal and output at a speaker (not shown). The PTT controller 72 is involved in setting up the PNT connection with the PTT receiver 60 and also controls the audio processor/time compressor 66 and the playout buffer 68 in the second example embodiment. Alternatively, the positions of the audio processor 66 and decoder 64 can be exchanged and the time compression performed on the coded information. As another alternative, a feedback link from the playout buffer 68 to the audio processor 66 may be used to provide a basis for the time compression. In other words, the amount of data in the playout buffer 68 dictates the amount of compression. If the amount of buffered data exceeds a threshold amount, time compression (or some alternative delay compensation technique) is employed.

Figure 6:
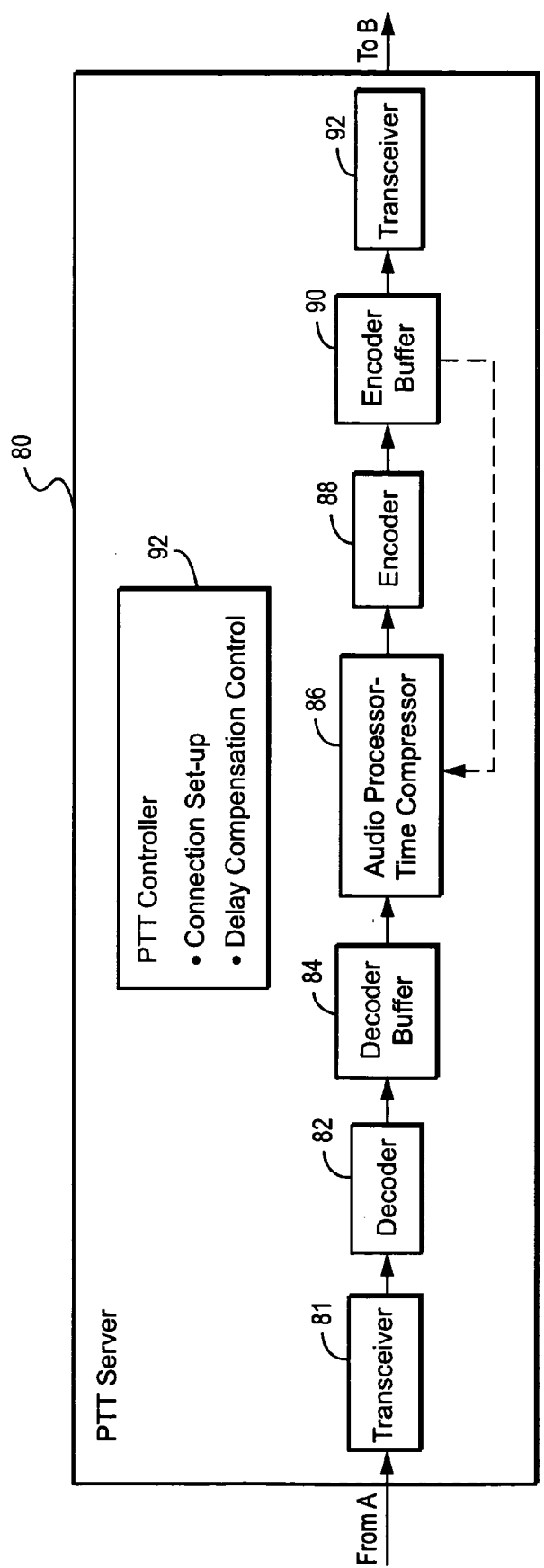
FIG. 6 is a function block diagram illustrating a PTT server.

FIG. 6 illustrates in function block form a PTT server 80. Digital information is received from the sender A at a transceiver 81, decoded into digital information by decoder a 82, and stored in a decoder buffer 84. An (optional) audio processor-time compressor 86 is employed in the third example embodiment to time-compress the data retrieved from the decoder buffer 84. The encoder 88 encodes the time compressed data at a set coding rate and stores the encoded information in an encoder buffer 90. Encoded information from 90 is transmitted by a transceiver 92 at a prescribed link transmission rate to receiver B. The PTT controller 92 helps set-up the PTT connection and also controls the audio processor-time compressor 86, the encoder buffer 90 read in/readout, and the link transmission rate in the third example embodiment. Alternatively, the compression may be performed on the coded information without requiring the decoding and encoding. As another alternative, a feedback link from the encoder (or other) buffer 90 to the audio processor 86 may be used to provide a basis for the time compression. In other words, the amount of data in the buffer 90 dictates the amount of compression. If the amount of buffered data exceeds a threshold amount, time compression (or some alternative delay compensation technique) is employed.

Figure 7:
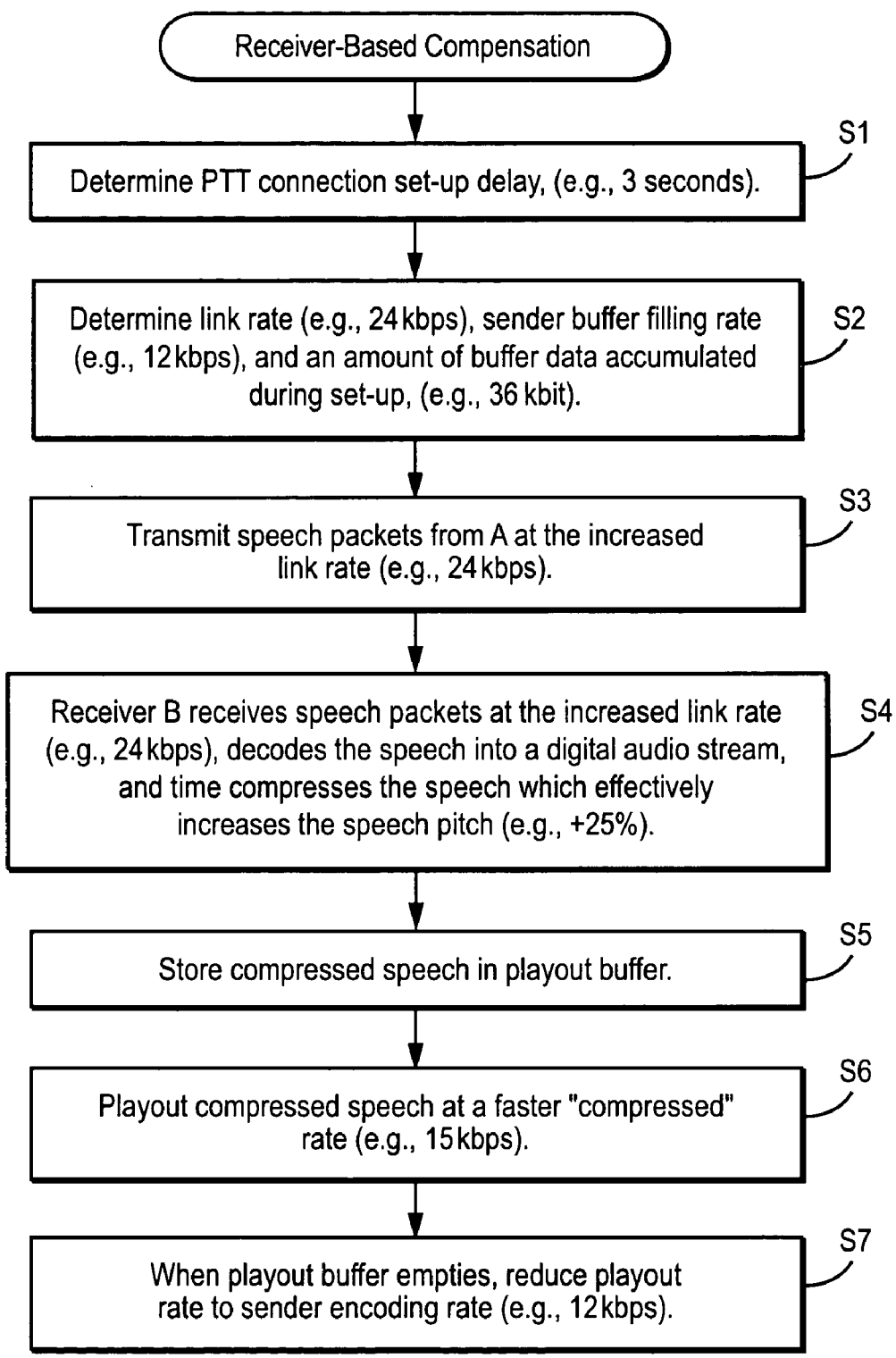
FIG. 7 is a flowchart that illustrates an example receiver-based compensation process.

FIG. 7 illustrates a receiver-based example embodiment for implementing time delay compensation. It may be implemented using hardware, software, or both. The push-to-talk controller 52 in the PTT receiver either determines (or receives from some other entity) a PTT set-up delay associated with setting up the PTT connection between A and B (step S1). For purposes of this example, the set-up delay is three seconds. The PTT controller 52 determines (or has provided to it) an increased link rate for transmitting the PTT information from A to the PTT server, a PTT sender buffer filling rate, and an amount buffered accumulated during the PTT set-up (step S2). In this non-limiting example, the increased link rate is 24 kilobits per second (kbps), the sender buffer filling rate is 12 kbps, and the amount of buffered data accumulated during the PTT connection set-up is 36 kilobits (i.e., 12 kbps for three seconds). Speech packets/frames are transmitted from the PTT sender A at the increased link rate, which in this example, is 24 kbps (step S3). The packets arrive from sender A at the PTT server and are forwarded as soon as possible onto receiver B. Although specific link rates are identified in this and the following examples for illustration purposes, a best-effort bearer may be used along with whatever capacity becomes available to transmit the data queued up in the sender and/or the server.

Receiver B receives speech packets/frames at the increased link rate (e.g., 24 kbps), decodes the speech packets into a digital audio stream, and time compresses the speech, which effectively increases the speech pitch (step S4). In this non-limiting example, the time compression corresponds to a 25% increase in speech pitch which means that the speech can be readout 25% faster. The compressed speech data is stored in the decoder/playout buffer 68 (step S5). The PTT controller 72 controls the playout of the compressed speech in the playout buffer in the receiver at a faster rate than the rate at which the sender buffer was filled (step S6). In this non-limiting example, a 25% pitch increase/time compression corresponds to an effective playout rate of 15 kbps. When the playout buffer 68 is emptied of A's initial message information, the playout rate is reduced to the sender encoding rate (step S7), which in this example is 12 kbps. Moreover, the link transmission rate is reduced to its regular value, which for example may correspond to the sender encoding rate, e.g., 12 kbps.

Figure 8:
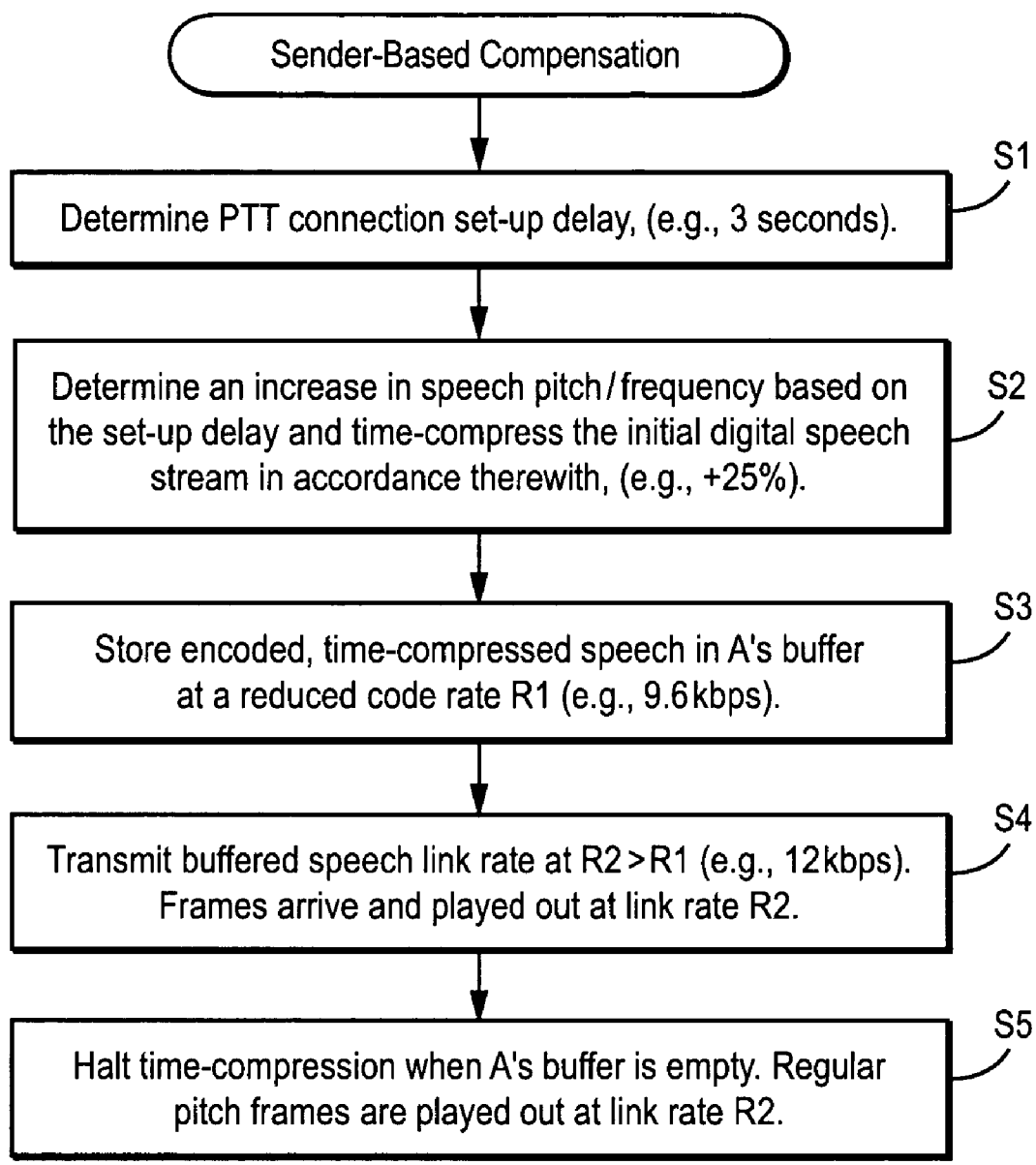
FIG. 8 is a flowchart that illustrates an example sender-based compensation process.

A second, non-limiting, example embodiment for implementing the set-up delay compensation is referred to as a sender-based compensation technique. The flowchart in FIG. 8 illustrates example process steps for the sender-based compensation embodiment which may be implemented using hardware, software, or both. The PTT controller 52 in the PTT sender A determines (or has provided to it) the PTT connection set-up delay for establishing the PTT connection between A and B (step S1). Again, in this example, the set-up delay is three seconds. The PTT controller 52 determines an increase in speech pitch/frequency based on the determined set-up delay and from that determines how much time compression must be applied to the initial digital speech from A (step S2). As in the prior example, the time compression corresponds to a 25% increase in speech pitch. After depressing the PTT button 41 and storing the initial message content in the recorder buffer 42, the audio processor-time compressor 44 time-compresses the speech in the recorder buffer 42 at a reduced code rate R1 (step S3). That reduced code rate R1, in this non-limiting example 9.6 kbps, reflects the 25% time compression. The time-compressed speech is then transmitted at a link rate R2 which is greater than the reduced coding rate R1 (step S4). In this non-limiting example, the link rate corresponds to 12 kbps. At the PTT server, the speech frames are received and forwarded as soon as possible. The speech frames arrive and are played out at link rate R2. When A's buffer is emptied of the initial message, the time compression is halted, and uncompressed speech frames are played out at the link rate R2 (step S5).

Figure 9:
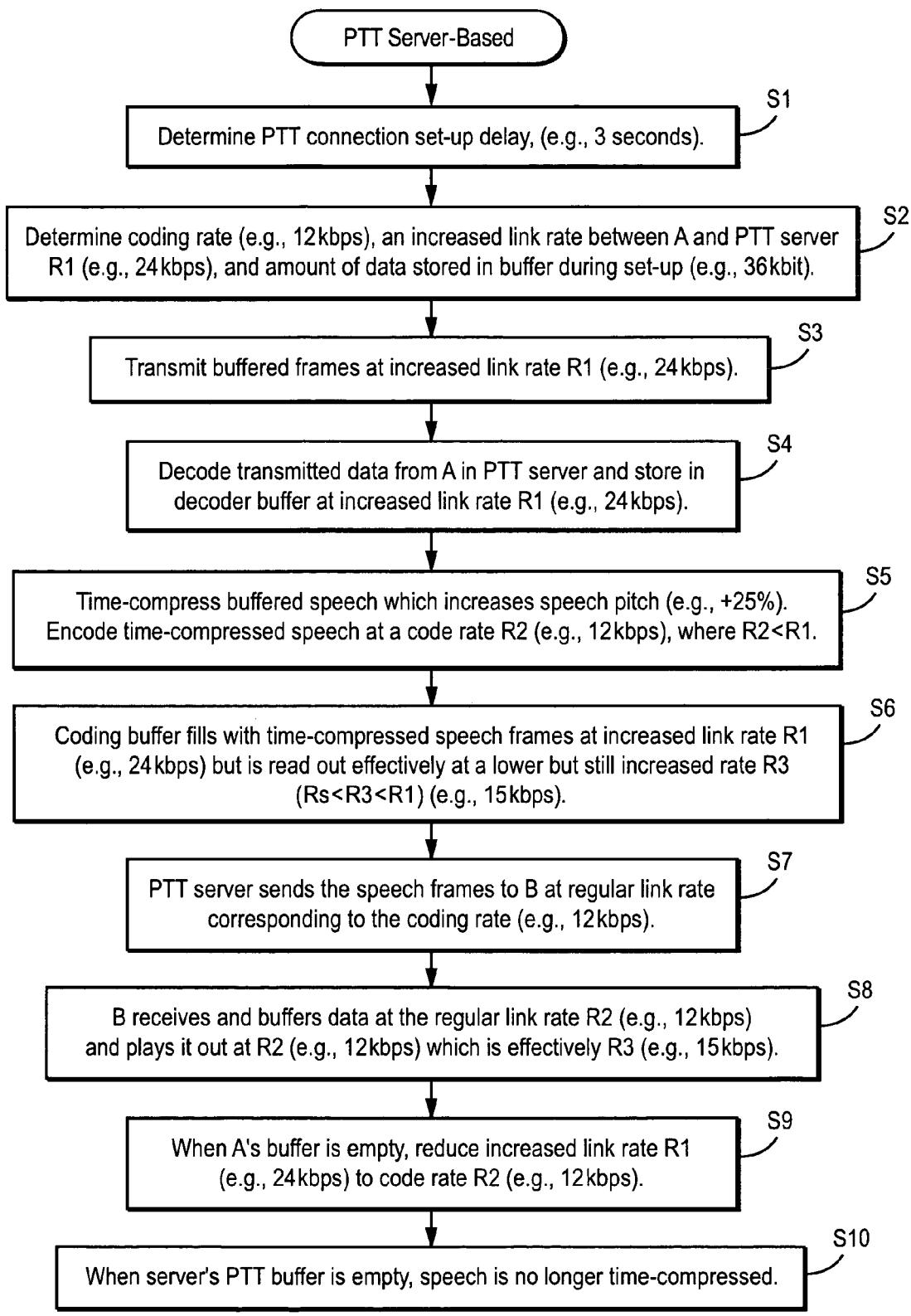
FIG. 9 is a flowchart that illustrates an example PTT server-based compensation process.

The third, non-limiting, example, embodiment is referred to as the PTT server-based embodiment. The flowchart in FIG. 9 illustrates example process steps for the PTT server-based compensation embodiment which may be implemented using hardware, software, or both. The PTT controller 92 determines (or has provided to it) the PTT connection set-up delay (step S1). As before, assume that this delay is three seconds. The PTT controller 92 also determines (or has provided to it) a coding rate, (e.g., 12 kbps), an increased link rate between sender A and the PTT server R1, (e.g. 24 kbps), and an amount of data stored in A's recorder buffer 42 during PTT set-up, (e.g., 36 kbit) (step S2). The buffered speech frames are transmit between A and the PTT server at the increased link rate R1, (e.g., 24 kbps) (step S3). The decoder 82 decodes the data from A and stores it in the decoder buffer 84 at the increased link rate R1, (e.g., 24 kbps) (step S4). The audio processor-time compressor 86 time compresses the buffered speech which increases the speech pitch (as in the prior examples by 25%). The encoder 88 encodes the time-compressed speech at a code rate R2 which is less than the increased link rate R1 (step S5). In this non-limiting example, that code rate R2 corresponds to 12 kbps. The encoder buffer 90 is filled with the time-compressed speech frames at the increased link rate R1, (e.g., 24 kbps), but is readout effectively at a lower, but still increased rate R3 (R2<R3<R1) (step S6). In this non-limiting example, R3 corresponds to 15 kbps. The PTT server 92 ensures the speech frames are transmitted at the transceiver at a regular link rate corresponding to the coding rate R2, (e.g., 12 kbps) (step S7). The receiver B receives and buffers data in the playout buffer 68 at the regular link rate R2 (12 kbps) and plays it out at rate R2, which because of the time compression, is effectively a faster rate R3, (e.g., 15 kbps) (step S8). When the initial message content in A has been completely transmitted by A, the transmission rate R1, (e.g., 24 kbps), is returned to the regular transmission rate R2, (e.g., 12 kbps) (step S9). When the encoder buffer 90 in the PTT server 80 empties of A's initial message, the time compression performed by the audio processor 86 is halted, and further data are read into and played out of the playout buffer 68 in receiver B at the same rate.

Figure 10:
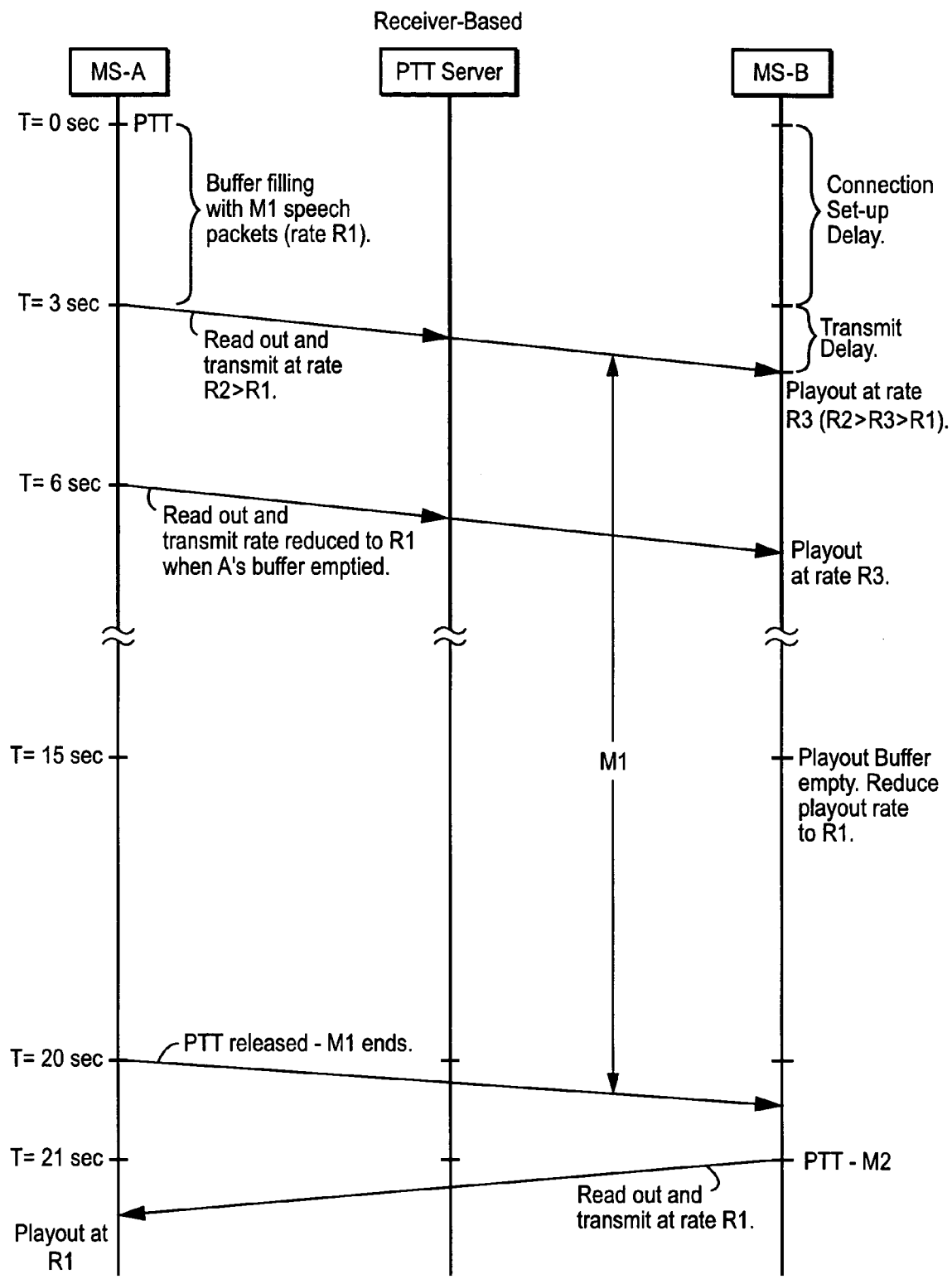
FIG. 10 illustrates a non-limiting example in which the receiver-based embodiment is employed.

FIG. 10 illustrates a time-line of a non-limiting, receiver-based example. At zero seconds, the user A presses the PTT button to send a message to B and starts talking. A's buffer starts filling up with A's initial message M1 speech frames at a rate R1. The connection set-up delay, corresponding to approximately 3 seconds in this example, occurs when the link between mobile A and the PTT server is being established. The initial message M1 is readout and transmission begins at 3 seconds at increased link rate R2. As speech frames arrive from A at the PTT server, they are forwarded to B as soon as possible without buffering. They start arriving at B sometime after the three second connection set-up delay corresponding to a transmission/propagation delay time. The received speech frames are played out at a faster rate then they were recorded at A. For example, if the frames are readout of A at a rate R1 of 12 kbps but received at B at a rate R2 of 24 kbps, they can be readout at 15 kbps at mobile B. In other words, the data is played out 25% faster at B then it was recorded at A. This corresponds to an increase in pitch in the speech of 25% which is acceptable in speech and video communications.

At 6 seconds, the recording buffer in mobile A is empty, so that the transmission rate is reduced from R1 to R2 (24 to 12 kbps). At a time of six seconds plus the transmission delay, B will have received 72 kbits (3 seconds *24 kbps) and will have played out 45 kbits (three seconds *15 kbps). There are still 27 kbits in B's playout buffer which continue to be readout at the increased rate of 15 kbps corresponding to a 25% increase in speech pitch. From this point on, B's playout buffer fills up at the code rate R1 corresponding to 12 kbps and drains at the higher effective playout rate of 15 kbps. At 15 seconds plus the transmission delay, B's playout buffer is essentially emptied. (In a practical application, one would likely leave a certain amount of data in the buffer to compensate for rate/delay variations, especially if a packet-switched transmission scheme is used). The new playout rate is reduced to the transmission rate R1 (e.g., 12 kbps) so that the filling and emptying of B's playout buffer is stabilized. At 20 seconds, the A stops talking, signalling the ends of the first message M1. At time 20 seconds plus the transmission delay, the last M1 message frames arrive at mobile B and are played out. At time 21 seconds, the user at mobile B responds with message M2 which is sent out the normal transmit rate, in this example 12 kbps, and is played out at mobile A after the transmission delay at the same rate.

Figure 11:
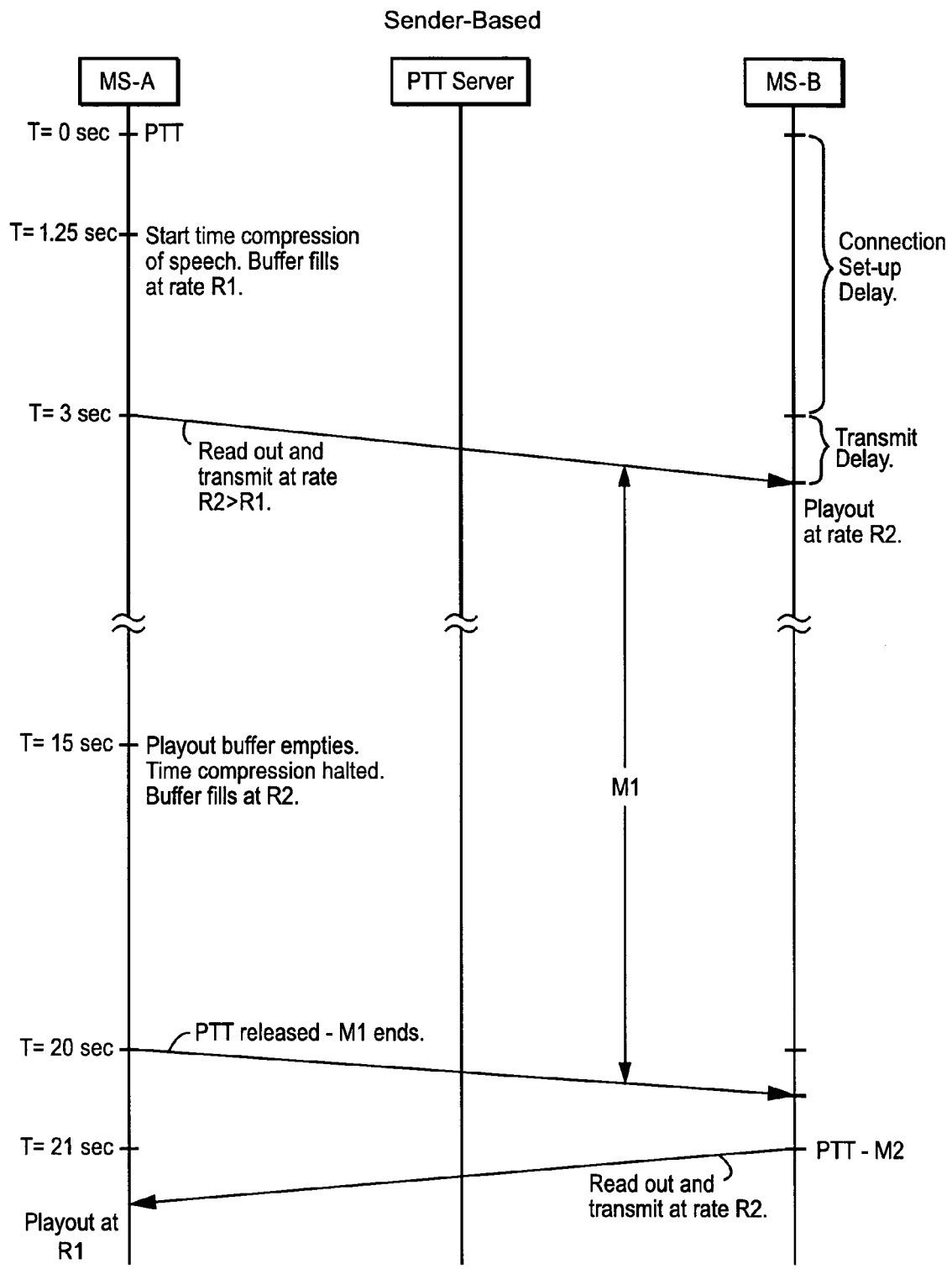
FIG. 11 illustrates a non-limiting example in which the sender-based embodiment is employed.

A time-line of a non-limiting, sender-based example is shown in FIG. 11. At zero seconds, the A presses the PTT button which initates establishment of a PTT connection via the PTT server with the mobile B. At the same time, the recording buffer in mobile A starts capturing digital audio for the initial message M1 from A. At 1.25 seconds, the audio processor 44 in mobile A begins time-compressing that speech (in this non-limiting example 1.25 seconds are compressed to fit into one second corresponding to an increase in pitch of 25%). At three seconds, the PTT connection has been set-up, and the time-compressed data is sent out at the link rate, (e.g., 12 kbps). The encoder buffer 48 in mobile A contains three seconds of original speech, which when time-compressed, corresponds to 2.4 seconds of compressed speech (2.4 seconds *12 kbps equals 28.8 kbits). Effectively in this example, the speech data is stored in the encoder buffer 48 at code rate 9.6 kbps, and the packets are output at a code rate of 12 kbps. The data is forwarded by the PTT server without delay or buffering. At three seconds plus the transmission delay, the speech frames arrive at B at 12 kbps and are played out at the same rate. At time 15 seconds, the encoder buffer 48 is emptied, and the PTT controller halts the time compression being performed by the audio processor 44. At 15 seconds plus the transmission delay, B receives the frames at the normal rate without compression.

Figure 12:
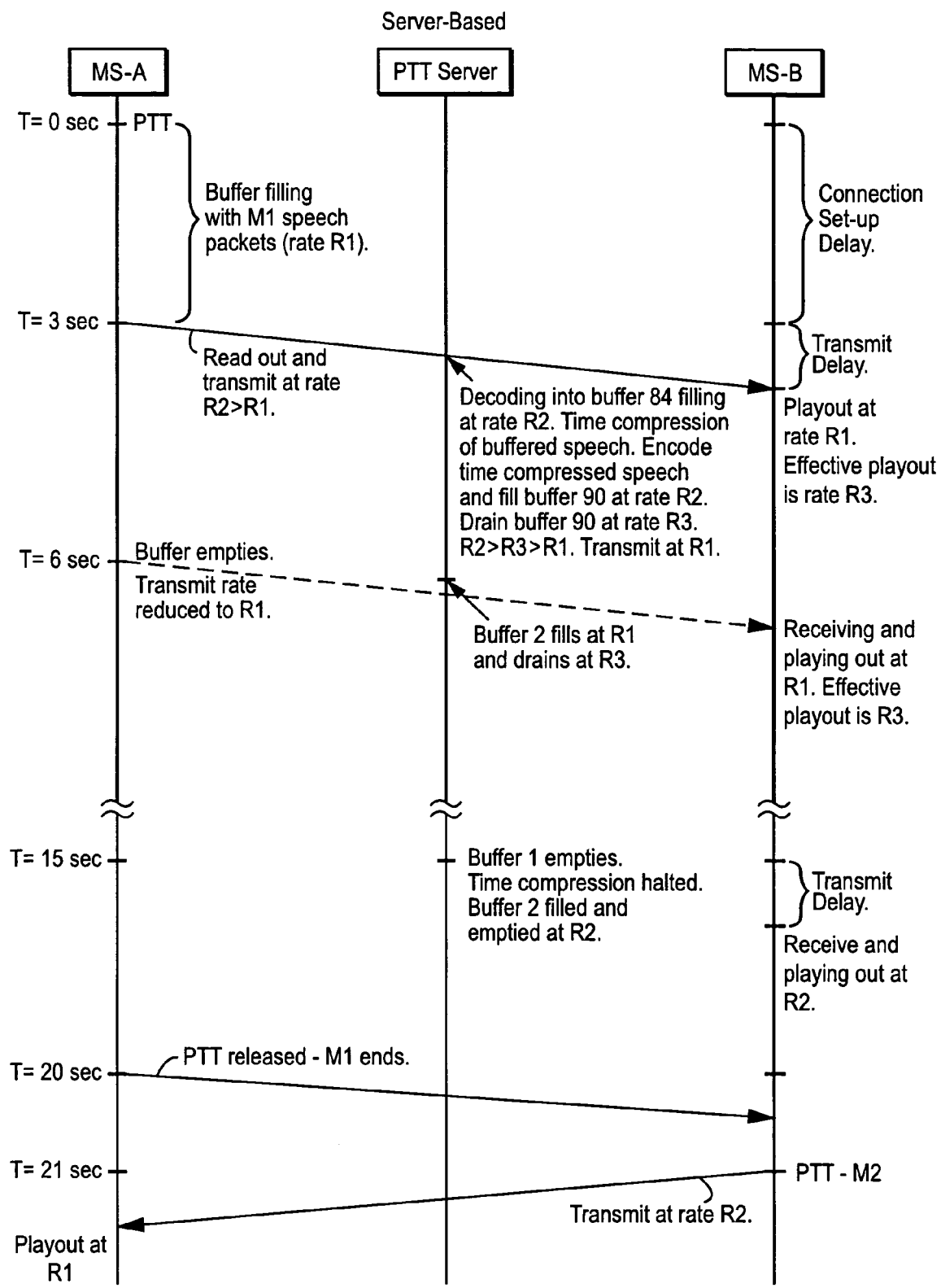
FIG. 12 is a non-limiting example in which the server-based embodiment is employed.

A time-line of a non-limiting example of the server-based embodiment is illustrated in FIG. 12. At zero seconds, the user of mobile A presses the PTT button, and a PTT connection is initiated between A and B via the PTT server. A's recording buffer 42 starts filling with speech frames corresponding to the initial message M1. The buffered speech is encoded and stored in the encoding buffer 48 at a standard encoding rate R1 (for example 12 kbps). At three seconds, the PTT connection has been established, and data is readout from the encoding buffer at an increased link rate R2. In this example, the rate R2 (e.g., 24 kbps) is twice as fast as the rate R1 in which the encoder buffer is filled. Accordingly, at three seconds, there are 36 kbits (12 kbps* three seconds) stored in the encoder buffer 48. At three seconds plus a transmission delay, the initial speech packets are forwarded to the decoder buffer 84 at the increased rate R2. The audio processor 86 time-compresses the speech from the decoder buffer 84. The time-compressed speech is then encoded and stored in the encoder buffer 90. The encoder buffer fills at R2 (e.g., 24 kbps) and drains at effectively R3 (R2>R3>R1) (e.g., 15 kbps) and is transmitted at the normal link rate R1 to mobile B. Mobile B receives that information shortly thereafter and plays it out at that received link rate R1. Because of the time compression, the effective receiving rate corresponds to R3 (e.g., 15 kbps), so the playout from B's playout buffer 68 at the normal link rate R1 (e.g., 12 kbps) effectively occurs at a higher rate of R3 (e.g., 15 kbps). At six seconds, the encoder buffer in mobile A empties/stabilizes, (there is no backlog), and the transmission rate from A to the PTT server is decreased to the code rate R1. Shortly thereafter, 72 kbits have been received at the PTT server, (3 seconds *24 kbps), and 45 kbps have been played out so far, (3 seconds *15 kbps). 27 kbits remain in the encoder buffer 90 which continues to fill up at R1 (e.g., 12 kbps) and drain at R3 (e.g., 15 kbps). The mobile B receives the data at R1 (e.g., 12 kbps) and plays it out effectively at R3 (e.g., 15 kbps). At 15 seconds plus a short transmission delay, the encoder buffer 90 is empty. The time compression performed by the audio processor 86 is halted. The code rates are matched up to provide steady, stable operation.

Other delay compensation approaches and mechanisms for implementing them may be employed. For example, delay compensation may be based on buffer fill states. If the buffered data exceeds a threshold, playout is increased at the receiver. In other words, playout rate depends on the amount of data currently in the buffer. The flexibility of this compensation approach is particularly advantageous when the setup or other delays are not known or are not constant. Another example compensation technique for packetized information that specifies a playout rate in the packet header is to increase the playout rate in each packet's header until any delay is compensated. Real Time Protocol (RTP) headers use for transporting video are an example of packet headers that specify playout rates. This approach is advantageous because the packet content is not affected.

Several example embodiments have been described. But the invention is not limited to the disclosed embodiments. Any delay compensation technique may be used, and it can be implemented in any one or more nodes that affect a real time, interactive communication. The invention is applicable to any real time, interactive communication service and is not limited to PTT services or to first-time, initial communications. The invention is intended to cover various modifications and equivalent arrangements included within the scope of the appended claims.

The invention claimed is:

1. A method for use in a communications system, comprising:

initiating a real-time, interactive communication from a first communications device and providing digital content information from a user of the first communications device for transmission to a second communications device;

establishing a real-time, interactive connection between the first communications device and the second communications device during a delay time associated with establishing the real-time, interactive connection;

compensating for the delay time associated with establishing the real-time, interactive connection; and providing the digital content information to the second communications device over the established real-time, interactive connection such that, as a result of the delay time compensation, a user of the second communications device receives and can respond to the digital content information sooner than the second device user could without the delay time compensation.

2. The method in claim 1, wherein at least one of the communications devices are mobile radio terminals.

3. The method in claim 2, wherein the delay time includes the connection set-up time and a propagation time associated with sending the digital content information from the first communications device to the second communications device.

4. The method in claim 1, wherein the digital content information corresponds to speech information or non-speech information.

5. The method in claim 1, wherein the compensating includes time-compressing the digital content information until the delay time is compensated for.

6. The method in claim 5, wherein the compensating includes determining an amount of information stored in a buffer waiting to be communicated to the second device user, and controlling the rate at which the information is played out of the buffer based on the determined amount.

7. The method in claim 5, wherein the time compression occurs at the first communications device.

8. The method in claim 5, wherein the time compression occurs at the second communications device.

9. The method in claim 1, wherein the compensating includes playing out the digital content information at an increased rate at the second communications device.

10. The method in claim 1, wherein the real-time, interactive communication is established using a server, and wherein the server is involved in the compensating.

11. The method in claim 1, further comprising:
buffering the initial digital content information,
wherein the compensating includes temporarily increasing a transmission rate of the buffered initial digital content information so that the initial digital content information is transmitted over the real-time, interactive connection faster than the initial digital content information is buffered.

12. The method in claim 1, wherein the real-time, interactive connection is a push-to-talk (PTT) connection and the digital content information corresponds to speech information.

13. The method in claim 1, wherein the real-time, interactive communication is an interactive video communication.

14. The method in claim 1, wherein the digital content information corresponds to packets each having a packet header including a playout indicator, and wherein the compensating includes modifying the playout indicator in the packets to change the rate at which the packets are played out.

15. The method in claim 1, wherein the compensating includes determining an amount of information stored in a buffer waiting to be communicated to the second device user, and controlling the rate at which the information is played out of the buffer based on the determined amount.

16. For use in a communications system that supports real-time, interactive communications, a first terminal comprising:
an actuator actuable by a first user to engage in a real-time, interactive communication between the first terminal and a second terminal;
a buffer for storing digital content information from the first user to be sent to the second terminal;
transceiving circuitry for transmitting a request to establish a real-time, interactive connection between the first terminal and the second terminal;
a controller configured to determine a time delay associated with establishing the real-time, interactive connection; and
a delay compensator configured to compensate for the determined time delay so that a second user of the second terminal receives and can respond to the digital content information sooner than the second user could without the delay time compensation.

17. The first terminal in claim 16, wherein the delay compensator includes a time compressor for time-compressing the buffered digital content information to compensate for the time delay and for supplying the time-compressed information to the transceiving circuitry for transmission to the second device via the real-time, interactive connection.

18. The first terminal in claim 17, further comprising:
an encoder for coding the time-compressed information at an effective first rate that is less than a second rate at which the coded information is transmitted by the radio transceiving circuitry.

19. The first terminal in claim 16, wherein the delay compensator is configured to control the transceiving circuitry to transmit the digital content at a temporarily-increased transmission rate.

20. The first terminal in claim 16, wherein the controller is configured to halt operation of the delay compensator when the time delay has been compensated for.

21. The first terminal in claim 16, wherein the real-time, interactive connection is a push-to-talk (PTT) connection and the digital content information corresponds to speech information.

22. The first terminal in claim 16, wherein the real-time, interactive communication is an interactive video communication.

23. The first terminal in claim 16, wherein the digital content information corresponds to packets each having a packet header including a playout indicator, and wherein the delay compensator is configured to modify the playout indicator in the packets to change a rate at which the packets are played out.

24. The first terminal in claim 16, wherein the delay compensator is configured to determine an amount of information stored in the buffer waiting to be communicated to the second terminal user and to control a rate at which the information is played out of the buffer based on the determined amount.

25. For use in a communications system that supports a real-time, interactive communication service between a first terminal and a second terminal, the second terminal comprising:
transceiving circuitry for receiving digital content information from the first terminal at a first rate over a real-time, interactive connection established between the first terminal and the second terminal;
a controller configured to determine a time delay associated with establishing the real-time, interactive communication;
a buffer for storing the digital content information from the first terminal at the first rate and presenting the buffered information to a user of the second terminal; and
a delay compensator configured to compensate for the determined time delay so that the user of the second terminal receives and can respond to the digital content information sooner than the user could without the delay time compensation.

26. The second terminal in claim 25, wherein the delay compensator includes a time compressor for time-compressing the digital content information to compensate for the determined time delay and for supplying the time-compressed information for storage in the buffer, and
wherein the compressed information stored in the buffer is retrieved from the buffer at a second rate less than the first rate.

27. The second terminal in claim 26, wherein when the digital content information is transmitted from the first terminal, the transceiving circuitry is configured to receive subsequent digital content information from the first mobile radio at a third rate less than the first rate and the second rate.

28. The second terminal in claim 26, wherein when the digital content information is removed from the buffer, the controller is configured to have the buffer filled and emptied at a same rate.

29. The second terminal in claim 25, wherein digital content information includes speech information or non-speech information.

30. The second terminal in claim 25, wherein the real-time, interactive communication is an interactive video communication.

31. The second terminal in claim 25, wherein the real-time, interactive connection is a push-to-talk (PTT) connection and the digital content information corresponds to speech information.

32. The second terminal in claim 25, wherein the digital content information corresponds to packets each having a packet header including a playout indicator, and wherein the delay compensator is configured to modify the playout indicator in the packets to change a rate at which the packets are played out.

33. The second terminal in claim 25, wherein the delay compensator is configured to determine an amount of information stored in the buffer waiting to be communicated to the second terminal user and to control a rate at which the information is played out of the buffer based on the determined amount.

34. A real-time, interactive server for supporting a real-time, interactive communications service in a communications system between a first user device and a second user device, comprising:
 a user device controller configured to assist in establishing a real-time, interactive connection between the first user device and the second user device and determining a time delay associated with establishing the real-time, interactive connection;
 transceiving circuitry for receiving digital content information from the first user device at a first rate;
 a first buffer for storing the digital content information from the first user device at the first rate from which the buffered information is presented to a user of the second user device; and
 a delay compensator configured to compensate for the time delay so that the second device user is presented with the buffered information and can respond to the digital content information sooner than the second device user could without the delay time compensation.

35. The server in claim 34, wherein the delay compensator includes a time compressor for time-compressing the digital content information to compensate for the determined time delay and for supplying the time-compressed information for storage in a second buffer, and further comprising:
 a first buffer controller for retrieving the compressed information stored in the second buffer from the second buffer at a second rate less than the first rate.

36. The server in claim 35, further comprising:
 an encoder for coding the time compressed information, wherein the second buffer is a coding buffer for storing the coded information from the encoder at the first rate, and
 a second buffer controller for reading out the coded information in the second buffer for transmission at a third rate less than the second rate.

37. The server in claim 36, wherein after the digital content information is transmitted from the first user device, subsequent digital content information from the first user device is received at a third rate less than the first rate and the second rate.

38. The server in claim 36, wherein when the digital content information is removed from the second buffer, the second buffer controller is configured to fill and empty the second buffer at the same rate.

39. The server in claim 34, wherein the digital content information includes speech information or non-speech information.

40. The server in claim 34, wherein the real-time, interactive connection is a push-to-talk (PTT) connection and the digital content information corresponds to speech information.

41. The server in claim 34, wherein the real-time, interactive communication is an interactive video communication.

42. The server in claim 34, wherein the digital content information corresponds to packets each having a packet header including a playout indicator, and wherein the delay compensator is configured to modify the playout indicator in the packets to change a rate at which the packets are played out.

43. The server in claim 34, wherein the delay compensator is configured to determine an amount of information stored in the first buffer waiting to be communicated to the second terminal user and to control a rate at which the information is played out of the first buffer based on the determined amount.

44. Apparatus for use in a communications system, comprising:
 means for initiating a push-to-talk (PTT) communication from a first communications device and providing initial digital content information including speech information from a user of the first communications device for transmission to a second communications device;
 means for establishing a PTT connection between the first communications device and the second communications device during a delay time associated with establishing the PTT connection;
 means for compensating for the delay time associated with establishing the PTT connection; and
 means for providing to the initial digital content information to the second communications device over the established PTT connection such that, as a result of the delay time compensation, a user of the second communications device receives and can respond to the initial digital content information sooner than the second device user could without the delay time compensation.

45. The apparatus in claim 44, wherein the communications devices are mobile radio terminals.

46. The apparatus in claim 45, wherein the delay time includes the PTT connection set-up time and a propagation time associated with sending the initial digital content information from the first communications device to the second communications device.

47. The apparatus in claim 44, wherein the initial digital content information corresponds to speech information or non-speech information.

48. The apparatus in claim 44, wherein the compensating includes temporarily time-compressing the initial digital content information.

49. The apparatus in claim 48, wherein the time compression occurs at the first communications device.

50. The apparatus in claim 48, wherein the time compression occurs at the second communications device.

51. The apparatus in claim 47, wherein the means for compensating includes means for playing out the speech information at an increased rate at the second communications device.

52. The apparatus in claim 44, further comprising:
 means for establishing the PTT communication using a PPT server,
 wherein the PTT server is configured to assist in the compensating.

53. The apparatus in claim 44, wherein the initial digital content information is buffered, and
 wherein the means for compensating includes means for temporarily increasing a transmission rate of the buffered initial digital content information so that the initial digital content information is transmitted faster than the initial digital content information is buffered.

* * * * *

UNITED STATES PATENT AND TRADEMARK OFFICE
CERTIFICATE OF CORRECTION

| | | |
|---|---|---|
| PATENT NO. | : 7,292,564 B2 | Page 1 of 1 |
| APPLICATION NO. | : 10/719018 | |
| DATED | : November 6, 2007 | |
| INVENTOR(S) | : Ekstrom et al. | |

It is certified that error appears in the above-identified patent and that said Letters Patent is hereby corrected as shown below:

In Column 1, Line 41, delete "EP" and insert -- IP --, therefor.

In Column 5, Line 54, delete "PNT" and insert -- PTT --, therefor.

In Column 6, Line 4, delete "PNT" and insert -- PTT --, therefor.

In Column 9, Line 1, delete "initates" and insert -- initiates --, therefor.

In Column 14, Line 56, in Claim 52, delete "PPT" and insert -- PTT --, therefor.

Signed and Sealed this

Twenty-second Day of July, 2008

JON W. DUDAS
*Director of the United States Patent and Trademark Office*